US010996508B2

(12) United States Patent
Kang

(10) Patent No.: US 10,996,508 B2
(45) Date of Patent: May 4, 2021

(54) LIQUID CRYSTAL DISPLAY DEVICE

(71) Applicant: LG Display Co., Ltd., Seoul (KR)

(72) Inventor: Namkyu Kang, Seoul (KR)

(73) Assignee: LG Display Co., Ltd., Seoul (KR)

( * ) Notice: Subject to any disclaimer, the term of this patent is extended or adjusted under 35 U.S.C. 154(b) by 554 days.

(21) Appl. No.: 15/388,454

(22) Filed: Dec. 22, 2016

(65) Prior Publication Data

US 2017/0192303 A1    Jul. 6, 2017

(30) Foreign Application Priority Data

Dec. 30, 2015    (KR) .......................... 10-2015-0190241

(51) Int. Cl.
*G02F 1/13357*    (2006.01)

(52) U.S. Cl.
CPC .. *G02F 1/133606* (2013.01); *G02F 1/133608* (2013.01); *G02F 1/133603* (2013.01)

(58) Field of Classification Search
CPC ......... G02F 1/133606; G02F 1/133608; G02F 1/133603
See application file for complete search history.

(56) References Cited

U.S. PATENT DOCUMENTS

| H1332 H | * | 7/1994 | Deakyne | ..................... 428/297.4 |
| H1332 H | * | 7/1994 | Deakyne | ..................... 428/297.4 |
| 2004/0105044 A1 | * | 6/2004 | You | ................... G02F 1/133604 349/58 |
| 2004/0114372 A1 | * | 6/2004 | Han | ................... G02F 1/133604 362/330 |
| 2006/0014085 A1 | * | 1/2006 | Nakajima | ............ G02B 5/0257 430/7 |
| 2007/0013825 A1 | * | 1/2007 | Kim | .................. G02F 1/133608 349/58 |
| 2009/0021935 A1 | | 1/2009 | Lin | |
| 2011/0317344 A1 | | 12/2011 | Mao et al. | |

(Continued)

FOREIGN PATENT DOCUMENTS

| CN | 101592821 A | 12/2009 |
| CN | 102298222 A | 12/2011 |

(Continued)

OTHER PUBLICATIONS

Second Notification of Office Action dated Jun. 12, 2020, issued in corresponding Chinese Patent Appication No. 201611204614.7.

(Continued)

*Primary Examiner* — Phu Vu
(74) *Attorney, Agent, or Firm* — Morgan, Lewis & Bockius LLP

(57) ABSTRACT

Provided is a liquid crystal display device. The liquid crystal display device includes a guide frame, a plurality of light sources disposed on the guide frame, a diffusion member disposed above the plurality of light sources as being spaced away from the plurality of light sources, and a plurality of wires disposed between the plurality of light sources and the diffusion member. The liquid crystal display device according to an exemplary embodiment of the present disclosure uses the diffusion member having a smaller thickness than a related art diffusion plate. Thus, it is possible to reduce the overall thickness of the liquid crystal display device. Further, it is possible to support the diffusion member with the plurality of wires.

7 Claims, 4 Drawing Sheets

(56) References Cited

U.S. PATENT DOCUMENTS

| | | | |
|---|---|---|---|
| 2013/0002976 A1 | 1/2013 | Notermans | |
| 2013/0258565 A1* | 10/2013 | Nishi | H05K 7/14 |
| | | | 361/679.01 |
| 2014/0111742 A1* | 4/2014 | Han | G02F 1/133504 |
| | | | 349/64 |
| 2015/0022757 A1 | 1/2015 | Toyooka et al. | |
| 2016/0149227 A1* | 5/2016 | Aotani | H01M 8/0245 |
| | | | 429/480 |
| 2016/0223725 A1* | 8/2016 | Lim | B29D 11/00798 |

FOREIGN PATENT DOCUMENTS

| | | |
|---|---|---|
| CN | 202253135 U | 5/2012 |
| CN | 102853331 A | 1/2013 |
| CN | 103472622 A | 12/2013 |
| CN | 104136970 A | 11/2014 |
| KR | 10-2007-0089471 A | 8/2007 |
| KR | 10-2015-0062796 A | 6/2015 |
| TW | 200905253 A | 2/2009 |

OTHER PUBLICATIONS

First Notification of Office Action dated Dec. 27, 2019, issued in corresponding Chinese Patent Application No. 201611204614.7.

\* cited by examiner

LIQUID CRYSTAL DISPLAY DEVICE

CROSS-REFERENCE TO RELATED APPLICATIONS

This application claims the priority of Korean Patent Application No. 10-2015-0190241 filed on Dec. 30, 2015, in the Korean Intellectual Property Office, the disclosure of which is incorporated herein by reference.

BACKGROUND

Field

The present disclosure relates to a liquid crystal display device, and more particularly, to a liquid crystal display device of which overall thickness can be reduced and in which a mura phenomenon can be suppressed.

Description of the Related Art

A liquid crystal display (LCD) device is a display device for displaying an image by adjusting the transmissivity of light generated from a light source. In the LCD device, the light source is disposed under a liquid crystal and an electric field is applied to the liquid crystal to control alignment of the liquid crystal. The LCD device is applied to various electronic devices such as a smartphone, and a tablet PC. An LCD device includes a backlight unit including a light source and a liquid crystal display panel disposed on the backlight unit.

In this case, the backlight unit is classified into a direct type and an edge type based on a position of the light source.

The edge type backlight unit has a structure in which a light source is disposed on only one lateral surface and a light emitted from the light source is reflected and diffused to the entire surface of the LCD device by a light guiding plate. Meanwhile, the direct type backlight unit has a structure in which a plurality of light sources is disposed on a back surface of the liquid crystal display panel and a light is irradiated directly under the liquid crystal display panel.

Recently, studies of large-size LCD devices have been actively conducted in response to the demands of consumers. In this case, the direct type backlight unit has a higher light efficiency than the edge type backlight unit. Thus, the direct type backlight unit is more suitable for a large-size LCD device.

However, in a related art direct backlight unit, lights emitted from a light source, for example, a light emission diode, have strong straightness and thus converge in a vertical direction. Therefore, a central portion corresponding to the light source is bright but its surrounding is dark, which is called a mura phenomenon. The mura phenomenon causes a decrease in brightness and non-uniformity in brightness and results in deterioration in display quality of the LCD device.

SUMMARY

In order to resolve the above-described mura phenomenon, a diffusion plate may be disposed on a light source. The diffusion plate functions to diffuse a light emitted from the light source and increase a cover area of the light. In this case, the diffusion plate is disposed above a reflection plate as being spaced away by a predetermined distance from the reflection plate.

At the same time, to resolve the mura phenomenon, the gap between the diffusion plate and the reflection plate may be increased. In this case, the distance between the diffusion plate and the reflection plate is referred to as an optical gap.

As the optical gap is increased, a difference in brightness between the central portion corresponding to the light source and its surroundings is reduced. Thus, the mura phenomenon can be reduced.

However, due to a thickness of the diffusion plate and the optical gap, a total thickness of a liquid crystal display device is increased, which thus makes it difficult to develop a thin liquid crystal display device having a large size.

Accordingly, the present invention is directed to a liquid crystal display device that substantially obviates one or more of the problems due to limitations and disadvantages of the related art.

Accordingly, an object of the present disclosure is to provide a liquid crystal display device in which the mura phenomenon can be minimized and a thickness of a backlight unit can be greatly reduced using a thin diffusion member instead of a thick diffusion plate. Another object of the present invention is to provide a liquid crystal display device that can solve a problem of sagging of the optical member caused by a weight of an optical sheet.

Another object of the present disclosure is to provide a liquid crystal display device in which a mura phenomenon is suppressed and uniformity in brightness is improved.

Another object of the present disclosure is to provide a liquid crystal display device in which a plurality of wires is disposed under a diffusion member so as to support the diffusion member and an optical sheet.

Additional features and advantages of the invention will be set forth in the description that follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a liquid crystal display device comprises a guide frame, a plurality of light sources on the guide frame, a diffusion member above and spaced away from the plurality of light sources, and a plurality of wires between the plurality of light sources and the diffusion member. The liquid crystal display device according to an exemplary embodiment of the present disclosure uses the diffusion member having a smaller thickness than a related art diffusion plate. Thus, it is possible to suppress a mura phenomenon. Further, it is possible to support the diffusion member with the plurality of wires.

In another aspect, a liquid crystal display device comprises a guide frame, a plurality of light sources disposed on the guide frame, a diffusion member disposed above the plurality of light sources as being spaced away from the plurality of light sources, configured to diffuse light emitted from the plurality of light sources and formed of a fiber material, a plurality of optical sheets disposed on the diffusion member, and a plurality of wires disposed in contact with the diffusion member so as to support the diffusion member and the plurality of optical sheets and fixed to the guide frame.

In another aspect, liquid crystal display device comprises a plurality of light sources in a frame; a functional film above the light sources to provide light diffusion and configured to have a significantly reduced thickness when compared to a related art diffusion plate; and a support structure under said functional film to provide support thereto.

Details of other exemplary embodiments will be included in the detailed description of the disclosure and the accompanying drawings.

According to the present disclosure, the liquid crystal display device including a direct type backlight unit uses the diffusion member having a small thickness instead of a diffusion plate having a large thickness. Thus, it is possible to minimize a mura phenomenon and non-uniformity in brightness.

It is to be understood that both the foregoing general description and the following detailed description are exemplary and explanatory and are intended to provide further explanation of the invention as claimed.

BRIEF DESCRIPTION OF THE DRAWINGS

The above and other aspects, features and other advantages of the present disclosure will be more clearly understood from the following detailed description taken in conjunction with the accompanying drawings, in which.

DETAILED DESCRIPTION

Figure 1:
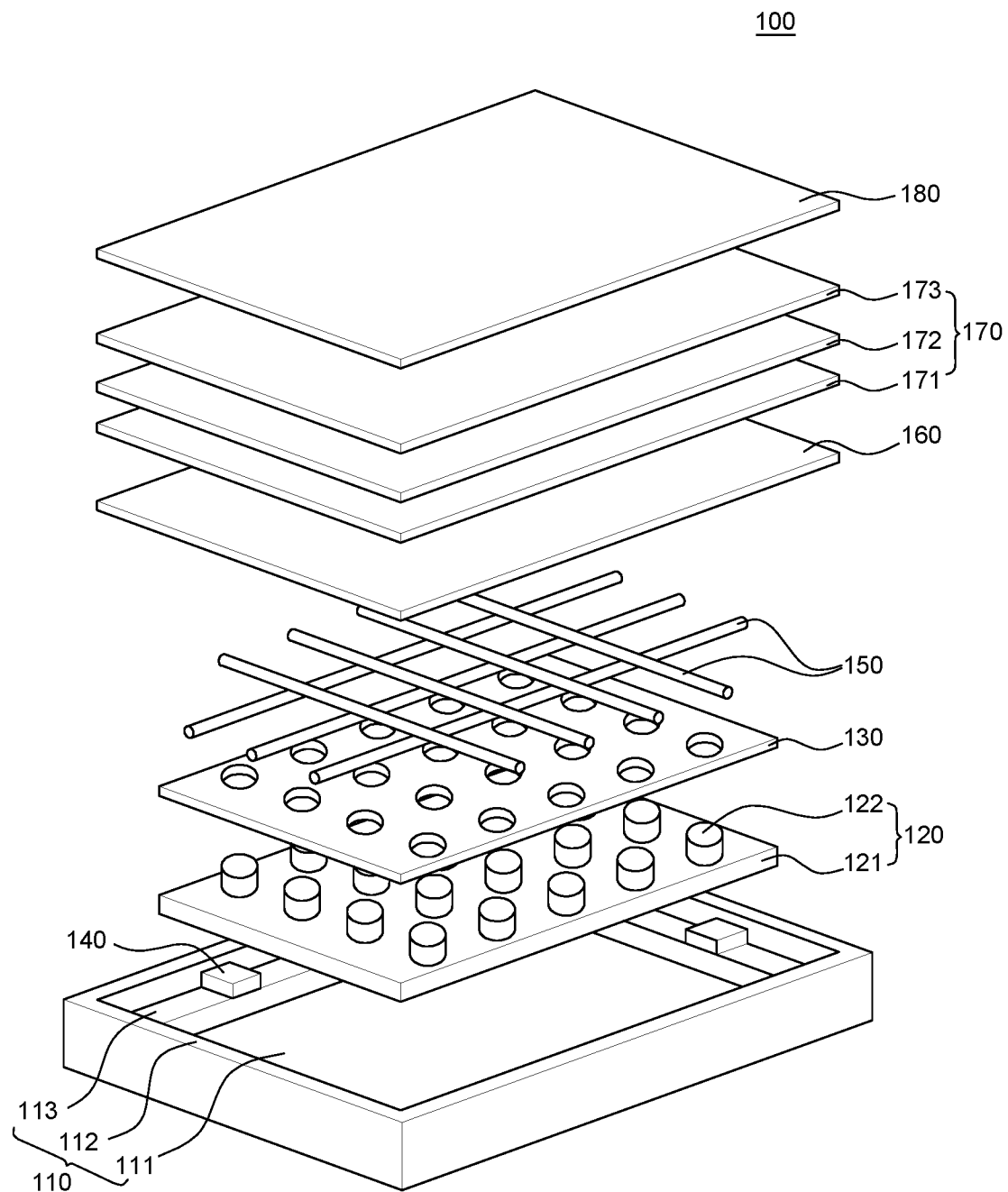
FIG. 1 is an exploded perspective view provided to explain a liquid crystal display device according to an exemplary embodiment of the present disclosure.

Advantages and features of the present disclosure, and methods for accomplishing the same will be more clearly understood from exemplary embodiments described below with reference to the accompanying drawings. However, the present disclosure is not limited to the following exemplary embodiments but may be implemented in various different forms. The exemplary embodiments are provided only to complete disclosure of the present disclosure and to fully provide a person having ordinary skill in the art to which the present disclosure pertains with the category of the disclosure, and the present disclosure will be defined by the appended claims.

The shapes, sizes, ratios, angles, numbers, and the like shown in the accompanying drawings for describing the exemplary embodiments of the present disclosure are merely examples, and the present disclosure is not limited thereto. Like reference numerals generally denote like elements throughout the present specification. Further, in the following description, a detailed explanation of well-known related technologies may be omitted to avoid unnecessarily obscuring the subject matter of the present disclosure. The terms such as "including," "having," and "consist of" used herein are generally intended to allow other components to be added unless the terms are used with the term "only". Any references to singular may include plural unless expressly stated otherwise.

Components are interpreted to include an ordinary error range even if not expressly stated.

When the position relation between two parts is described using the terms such as "on", "above", "below", and "next", one or more parts may be positioned between the two parts unless the terms are used with the term "immediately" or "directly".

When an element or layer is referred to as being "on" another element or layer, it may be directly on the other element or layer, or intervening elements or layers may be present.

Although the terms "first", "second", and the like are used for describing various components, these components are not confined by these terms. These terms are merely used for distinguishing one component from the other components. Therefore, a first component to be mentioned below may be a second component in a technical concept of the present disclosure.

Throughout the whole specification, the same reference numerals denote the same elements.

Since size and thickness of each component illustrated in the drawings are represented for convenience in explanation, the present disclosure is not necessarily limited to the illustrated size and thickness of each component.

The features of various embodiments of the present disclosure can be partially or entirely bonded to or combined with each other and can be interlocked and operated in technically various ways, and the embodiments can be carried out independently of or in association with each other.

Hereinafter, various exemplary embodiments of the present disclosure will be described in detail with reference to the accompanying drawings.

Figure 2:
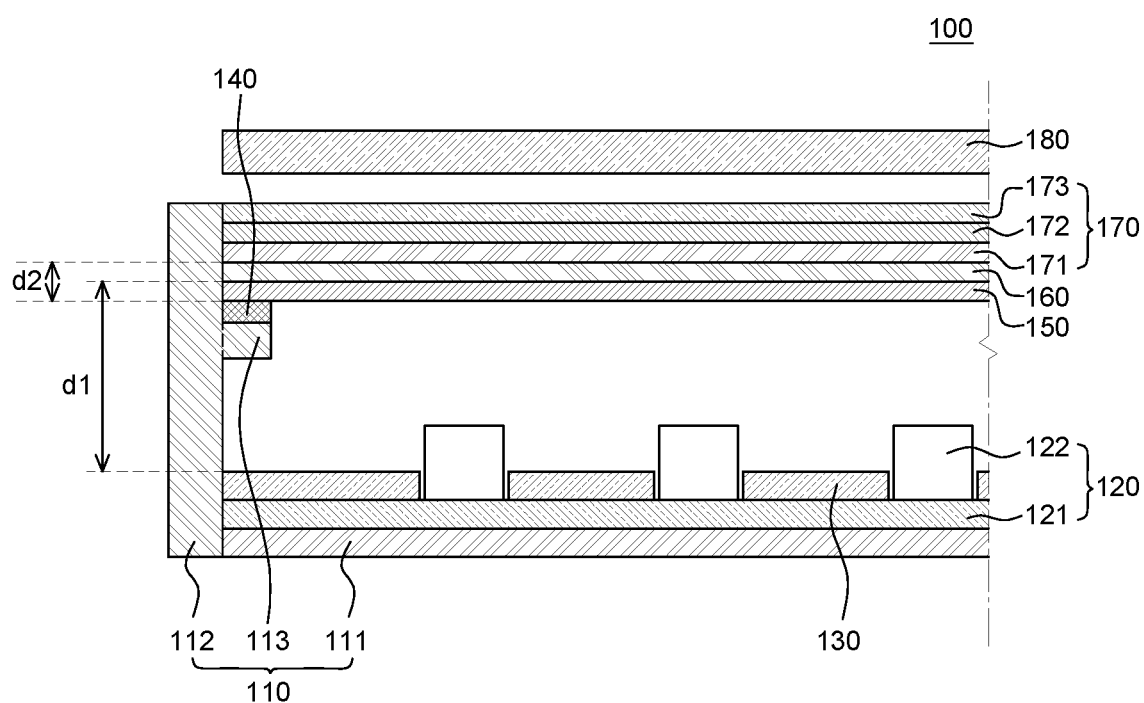
FIG. 2 is a cross-sectional view provided to explain the liquid crystal display device according to an exemplary embodiment of the present disclosure.

FIG. 1 is an exploded perspective view provided to explain a liquid crystal display device according to an exemplary embodiment of the present disclosure. FIG. 2 is a cross-sectional view provided to explain the liquid crystal display device according to an exemplary embodiment of the present disclosure. Referring to FIG. 1 and FIG. 2, a liquid crystal display device 100 according to an exemplary embodiment of the present disclosure includes a liquid crystal display panel 180 and a backlight unit. The backlight unit includes a guide frame 110, a light source unit 120, a reflection sheet 130, a double-sided adhesive member 140, a plurality of wires 150, a diffusion member 160, and an optical sheet 170. Here, the plurality of wires 150 can also be referred to as a support structure, a mesh or array of metal lines, or some other equivalent element. Also, the diffusion member 160 can also be referred to as a diffusion film (due to its significant reduction in thickness compared to a related art diffusion plate), a functional layer having diffusion characteristics, an optical film configured to provide light diffusion or dispersion function, or some other equivalent element.

The liquid crystal display panel 180 includes a lower polarizing plate, a lower substrate, a liquid crystal layer, an upper substrate, and an upper polarizing plate. The liquid crystal display panel 180 displays an image by adjusting a transmittance of a light emitted from the backlight unit.

The lower polarizing plate and the upper polarizing plate polarize lights. For example, the lower polarizing plate polarizes a light emitted from the backlight unit and provides the light to the lower substrate. The upper polarizing plate polarizes a light passing through the upper substrate and emits the light to an upper part of the liquid crystal display panel 180.

The lower substrate is a substrate configured to support various components constituting the liquid crystal display panel 180. A thin film transistor (TFT), a pixel electrode electrically connected to the TFT, and a common electrode which may form an electric field with the pixel electrode are disposed on the lower substrate. Thus, the lower substrate may be referred to as a TFT substrate. The TFT forms an electric field between the pixel electrode and the common electrode on the basis of a drive signal transmitted through a line.

The upper substrate is disposed to face the lower substrate. The upper substrate is configured to support a color filter layer, and may be referred to as a color filter substrate. The color filter layer selectively transmits a light having a specific wavelength. A full-color image is displayed through the color filter layer.

The liquid crystal layer is disposed between the upper substrate and the lower substrate. The liquid crystal layer is aligned in a certain direction. The alignment of a liquid crystal may be changed on the basis of the electric field between the pixel electrode and the common electrode. The transmittance of the light emitted from the backlight unit can be controlled by changing the alignment of the liquid crystal, and a light penetrating the liquid crystal is emitted to an active area of the liquid crystal display panel 180.

The liquid crystal display panel 180 may be fixed as being bonded to the guide frame 110. The liquid crystal display panel 180 may be bonded to the guide frame 110 by an adhesive member. The adhesive member may be a related art double-sided tape disposed between the liquid crystal display panel 180 and the guide frame 110 or between the liquid crystal display panel 180 and the backlight unit. Further, the adhesive member may bond an outer surface of the liquid crystal display panel 180 and an outer surface of a lateral frame 112 of the guide frame 110 using a curable resin composition to compensate a decrease in adhesive force of the double-sided tape caused by a reduction of a bezel area. In this case, the curable resin composition is formed of a resin composition having a high stiffness. For example, the adhesive member may be formed of an acrylate-based resin composition. The acrylate-based resin composition may be a photo-curable resin composition which is cured by ultraviolet or infrared light, or a heat-curable resin composition which is cured by heat. The curable resin composition may include a light-absorbing material such as carbon black in order to suppress a light emitted from the backlight unit from being leaked between the guide frame 110 and the liquid crystal display panel 180. In FIG. 1 and FIG. 2, illustration of the adhesive member is omitted for convenience in explanation.

Further, although not illustrated in FIG. 1, the liquid crystal display device 100 may be fixed as being bonded to a cover glass which is disposed on the uppermost end and configured as a screen exterior of the liquid crystal display device 100.

The backlight unit emits a light to the liquid crystal display panel 180. The backlight unit includes the guide frame 110, the light source unit 120, the reflection sheet 130, the double-sided adhesive member 140, the plurality of wires 150, the diffusion member 160, and the optical sheet 170.

The guide frame 110 is a member configured to support the liquid crystal display panel 180 and the backlight unit. The guide frame 110 can be an open-top rectangular box shape. The guide frame 110 accommodates therein the light source 120, the reflection sheet 130, the plurality of wires 150, the diffusion member 160, and the optical sheet 170.

The guide frame 110 includes a lower frame 111, the lateral frame 112, and a support 113.

The lower frame 111 can have a plate shape and may be formed of a metal material having a sufficient stiffness. For example, the lower frame 111 may be formed of aluminum (Al), iron (Fe), steel use stainless (SUS), or alloys thereof, but is not limited thereto. The lower frame 111 can be combined or attached with the lateral frame 112. Herein, the metal lower frame 111 supports the lateral frame 112 with a sufficient stiffness in order to suppress bending or torsion of the lateral frame 112.

The lateral frame 112 is disposed to surround a lateral surface of the lower frame 111. The lateral frame 112 may be formed of a light-absorbing resin. The lateral frame 112 may be bonded to the liquid crystal display panel 180, or may be bonded to the cover glass.

The support 113 has a structure capable of supporting the plurality of wires 150 and an edge of the diffusion member 160 to be described later. The support 113 may be connected to the lateral frame 112 or the lower frame 111 of the guide frame 110. The support 113 may be formed as one body with the lateral frame 112 or the lower frame 111.

In the liquid crystal display device 100 illustrated in FIG. 1, the support 113 may be a protrusion protruded inward from the lateral frame 112. In this case, the protrusion may have a length and a thickness sufficient to mount thereon the plurality of wires and the diffusion member 160. Further, the protrusion may have any appropriate shape as necessary.

The support 113 may be a stepped portion formed on the lateral frame 112 in some exemplary embodiments. That is, the lateral frame 112 may include a first upper surface on the outside and a second upper surface on the inside with a smaller height than the first upper surface. In this case, the second upper surface may mount thereon the plurality of wires and the diffusion member 160.

In other exemplary embodiments, the support 113 may be formed from the lower frame 111. For example, the support 113 may have a structure which is bent from both ends of the lower frame 111 to an upper side and then bent outward to form an upper surface.

The light source unit 120 includes a plurality of light sources 122 and a substrate which mounts thereon the plurality of light sources 122. The plurality of light sources 122 emits lights toward the liquid crystal display panel 180. The substrate 121 is a flexible printed circuit board (PCB) having high flexibility. A circuit is formed at the substrate 121, and, thus, external power can be supplied to the light sources through the circuit. The liquid crystal display device 100 according to an exemplary embodiment of the present disclosure includes a direct type backlight unit. Thus, the light source unit 120 is disposed on the lower frame 111 and configured to emit light to an upper side. Further, the light source unit 120 may further include an adhesive layer so as to be in contact with the guide frame 110.

The plurality of light sources 122 may be light emission diodes (LED), but is not limited thereto. The plurality of light sources 122 may include a cold cathode fluorescent lamp (CCFL) or an external electrode fluorescent lamp instead of LEDs. FIG. 1 and FIG. 2 illustrate a case where LEDs are applied.

The reflection sheet 130 reflects light generated from the plurality of light sources 122. To be more specific, the reflection sheet 130 reflects some light, which is emitted from the plurality of light sources 122 to a lower side between the plurality of light sources 122, toward the liquid crystal display panel 180. Thus, light efficiency can be improved by use of such reflection sheet 130. Further, the reflection sheet 130 can be used to control the overall reflection of incident light in order for the entire light-exit surface to have a uniform brightness distribution.

The reflection sheet 130 may include openings corresponding to the plurality of light sources 122 such that the plurality of light sources 122 of the light source unit 120 can be inserted and protruded, i.e. accommodated. The reflection sheet 130 is disposed on the substrate 121 of the light source unit 120, and the plurality of light sources 122 is inserted into the openings.

The optical sheet 170 is disposed on a diffusion member (to be described later), and disposed under the liquid crystal display panel 180. The optical sheet 170 scatters light generated from the light source unit 120 and thus improves brightness. The optical sheet 170 may include a plurality of sheets including a diffusion sheet, a prism sheet, and a protection sheet.

The diffusion sheet diffuses lights from the light source unit 120 and supplies the lights to the liquid crystal display panel 180. That is, the diffusion sheet provides secondary scattering of light diffused by the diffusion member (to be described later) and emits the light to the liquid crystal display panel 180. The prism sheet includes an upper surface on which triangular prisms are aligned in a particular manner. The prism sheet functions to collect the light diffused by the diffusion sheet in a direction perpendicular to the plane of the liquid crystal display panel 180. Most of the lights penetrating the prism sheet propagate vertically or in a perpendicular manner, resulting in a uniform brightness distribution. The protection sheet located on the prism sheet protects the prism sheet which is vulnerable to scratches or other damage.

The diffusion member 160 is disposed above the plurality of light sources 122 as being spaced away from the plurality of light sources 122. The diffusion member 160 primarily scatters light emitted from the plurality of light sources 122 and light reflected by the reflection sheet 130, and then, emits the light toward the optical sheet 170. That is, the diffusion member 160 scatters light, so that brightness distribution of the liquid crystal display device 100 can be uniform.

Herein, the diffusion member 160 may be formed of a fiber material. Specifically, the diffusion member 160 may include birefringent microfibers having a thickness of 0.1 to 30 μm. For example, the fiber material which can be used as the diffusion member 160 may include one or more members selected from the group consisting of polyester, polyurethane, polymethyl methacrylate (PMMA), and nylon. The fiber material can diffuse some light and shield some light. Although the fiber material has a minute thickness, it can effectively reduce a difference in brightness between a central portion perpendicular to the plurality of light sources 122 and its surroundings. Therefore, brightness uniformity of the liquid crystal display device 100 can be improved. For example, in the liquid crystal display device 100 according to an exemplary embodiment of the present disclosure, a difference between a maximum brightness and a minimum brightness in an active area may be 10% or less.

The diffusion member 160 formed of the fiber material has a significantly smaller thickness than a diffusion plate used in a related art direct type backlight unit. The related art diffusion plate is formed of a diffusion medium material such as polycarbonate and polyethylene terephthalate (PET), and typically has a thickness of 1.5 mm or more. However, the diffusion member 160 used in the liquid crystal display device 100 according to an exemplary embodiment of the present disclosure has a thickness of 0.3 mm or less, for example, about 0.1 mm. Since the diffusion member 160 has a remarkably small thickness as compared with the related art diffusion plate, the overall thickness of the liquid crystal display device 100 can be reduced.

Meanwhile, the diffusion member 160 is disposed over the reflection sheet 130 and spaced apart (by a distance d1) from the reflection sheet 130. In this case, the distance d1 between the diffusion member 160 and the reflection sheet 130 can be referred to as an optical gap d1. In case of the direct type backlight unit, a sufficient optical gap d1 is needed in order to minimize a mura phenomenon caused by straightness characteristics of a light source. The optical gap d1 may be freely set depending on a distance between the plurality of light sources 122. For example, in the liquid crystal display device 100 according to an exemplary embodiment of the present disclosure, the optical gap d1 may be about 15 mm.

The plurality of wires 150 supports the diffusion member 160. Specifically, the plurality of wires 150 functions to support the diffusion member 160 so as to endure the weight of the diffusion member 160 itself and that of a plurality of optical sheets 170 disposed on the diffusion member 160. The diffusion member 160 used in the liquid crystal display device 100 according to an exemplary embodiment of the present disclosure has a remarkably small thickness as compared with the related art diffusion plate. Further, the fiber material constituting the diffusion member 160 may lack sufficient stiffness. Thus, the diffusion member 160 may sag downwardly due to the weight of the optical sheet 170 disposed thereon. Accordingly, in the liquid crystal display device 100 according to an exemplary embodiment of the present disclosure, a plurality of wires 150 is disposed directly under the diffusion member 160 to thus provide support thereto. Thus, it is possible to effectively suppress downward sagging or bending of the diffusion member 160.

Any type of wires or other structure can be used as the plurality of wires 150 as long as they are connected to the guide frame 110 and support the diffusion member 160 and the optical sheet 170. Herein, considering that the plurality of wires 150 is disposed within the backlight unit, the plurality of wires 150 may be formed of a transparent material.

Since the plurality of wires 150 supports the diffusion member 160 and the optical sheet 170 disposed thereon, the plurality of wires 150 has a low elongation with respect to the weight. The term "elongation" means the increase in length of a wire after the wire is applied with a tensile load and then increased in length. Therefore, a lower elongation means a higher endurance to the load. Thus, the plurality of wires 150 having a low elongation may be used.

Further, the plurality of wires 150 may have a high refractive index. If the plurality of wires 150 has a high refractive index, a difference in refractive index from air is increased. Thus, lights emitted from the plurality of light sources 122 are greatly diffused on the plurality of wires 150. That is, the plurality of wires 150 may function to diffuse light prior to the diffusion member 160.

The plurality of wires 150 may be formed of fluorocarbon. The fluorocarbon has a very low elongation and a high stiffness, and thus can endure the weight of the diffusion member 160 and the optical sheet 170. Further, the fluorocarbon has a refractive index of about 1.45, and thus can function to additionally diffuse light emitted from the light sources.

The plurality of wires 150 is disposed between the plurality of light sources 122 and the diffusion member 160 and spaced away from the plurality of light sources 122. The plurality of wires 150 is disposed in parallel with the lower frame 111 of the guide frame 110 so as to support the diffusion member 160 and the plurality of optical sheets 170. Further, the plurality of wires 150 may be disposed under the diffusion member 160 as being in contact with the diffusion member 160.

The plurality of wires 150 is disposed to intersect with each other. A pattern of the plurality of wires 150 will be described in detail with reference to FIG. 3A and FIG. 3B.

Figure 3A:
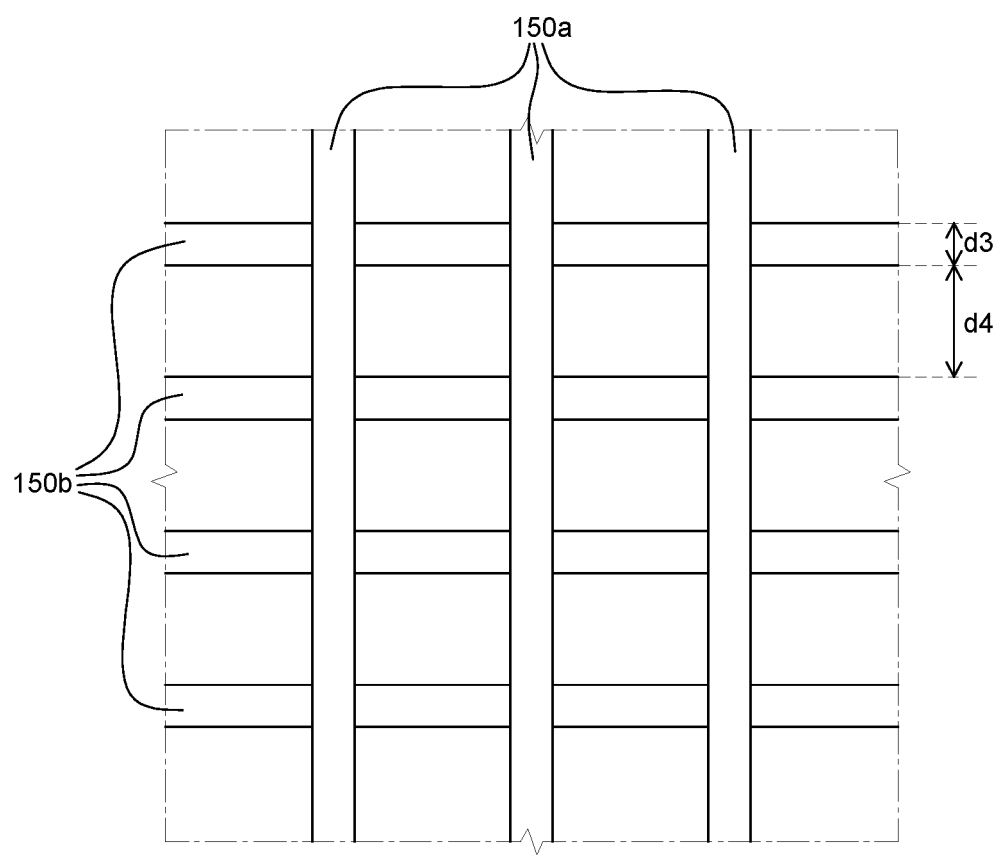
FIG. 3A and FIG. 3B are plane views provided to explain a plurality of wires used in a liquid crystal display device according to an exemplary embodiment of the present disclosure.
Figure 3B:
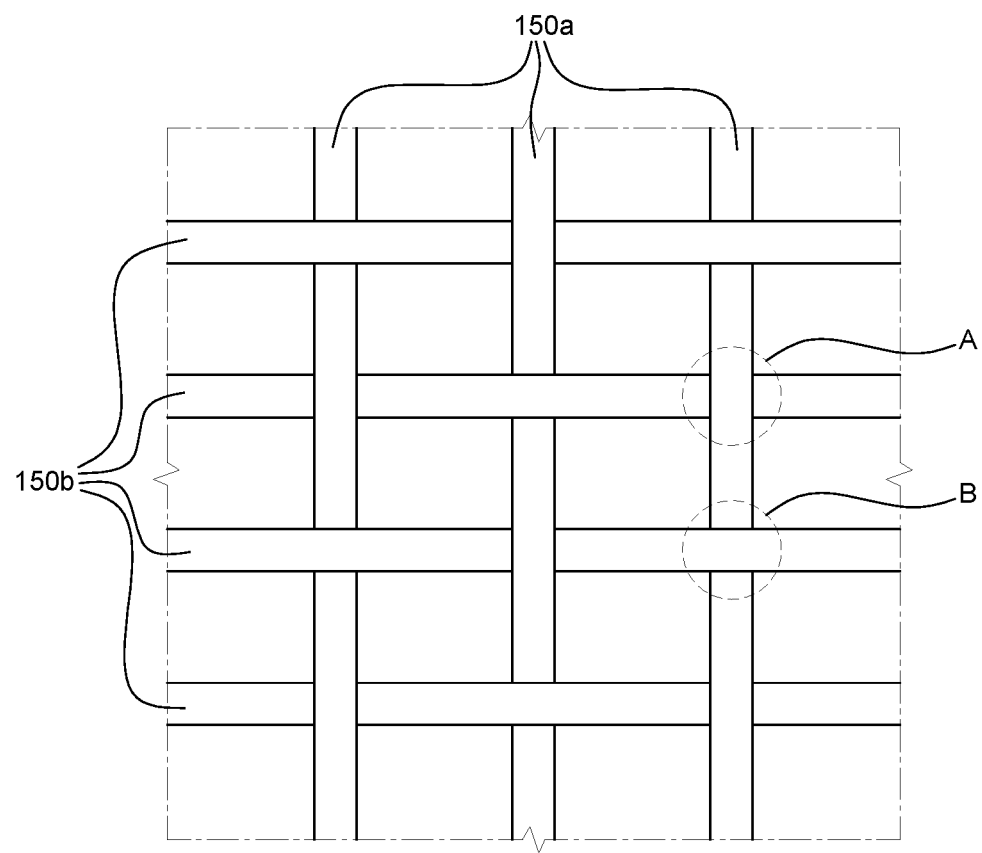

FIG. 3A and FIG. 3B are plane views provided to explain the plurality of wires 150 used in the liquid crystal display device 100 according to an exemplary embodiment of the present disclosure. Referring to FIG. 3A and FIG. 3B, the plurality of wires 150 may include a plurality of first wires 150a and a plurality of second wires 150b disposed to intersect with each other. The plurality of first wires 150a and the plurality of second wires 150b intersect with each other so as to form a mesh pattern. In this case, the plurality of first wires 150a and the plurality of second wires 150b may intersect with each other at a specific angle, or may be disposed perpendicularly to each other.

Meanwhile, the plurality of first wires 150a and the plurality of second wires 150b may randomly intersect with each other. For example, in case of the plurality of wires 150 illustrated in FIG. 3A, all of the plurality of first wires 150a are disposed on the plurality of second wires 150b.

Meanwhile, in case of the plurality of wires 150 illustrated in FIG. 3B, the plurality of first wires 150a and the plurality of second wires 150b may have a mesh pattern in which the plurality of first wires 150a and the plurality of second wires 150b are interlaced with each other. Specifically, the plurality of first wires 150 has first portions A disposed on the plurality of second wires 150b and second portions B disposed under the plurality of second wires 150b in an area where the plurality of first wires 150a intersect with the plurality of second wires 150b. The first portions A and the second portions B may be located alternately. The plurality of wires 150 having the mesh pattern include the plurality of first wires 150a and the plurality of second wires 150b alternately intersecting with each other, and thus can further improve the endurance to the weight.

The plurality of wires 150 may be fixed to the guide frame 110 so as to support the diffusion member 160 and the optical sheet 170. For example, each of the plurality of wires 150 may be fixed by connecting both ends of the wire to the lateral frame 112 including surfaces facing each other. In this case, the plurality of wires 150 may be connected to the guide frame 110 by various methods. For example, the plurality of wires 150 may be fixed by forming openings in the lateral frame 112 of the guide frame 110 including the surfaces facing each other and then tying the wires through the formed openings. Otherwise, the plurality of wires 150 may be fixed by forming ring-shaped concavo-convex portions on the lateral frame 112 including the surfaces facing each other and then hooking or tying the wires through the concavo-convex portions. Alternatively, the plurality of wires 150 may be connected to the guide frame 110 by bonding the double-sided adhesive member 140 to a partial area of the guide frame 110.

More specifically, referring to FIG. 2, the guide frame 110 includes the support 113 inside the lateral frame 112. In this case, the double-sided adhesive member 140 is disposed on the support 113 and then, the plurality of wires 150 is bonded on the double-sided adhesive member 140, so that the plurality of wires 150 can be fixed. In this case, the double-sided adhesive member 140 may be disposed on the support 113 as being separated corresponding to the plurality of wires 150 bonded thereto, as illustrated in FIG. 2. Otherwise, although not illustrated in the drawing, the double-sided adhesive member 140 on the support 113 may be extended along an inward direction of the lateral frame 112. That is, the double-sided adhesive member 140 may have a ring shape extended on the entire support 113.

Further, the double-sided adhesive member 140 may bond the plurality of wires 150 together with the diffusion member 160 located on the plurality of wires 150.

Meanwhile, the plurality of first wires 150a and the plurality of second wires 150b may have a thickness d3 of 0.5 mm or less. In particular, the thickness d3 may be 0.3 mm or less. If the thickness d3 of the plurality of first wires 150a and the plurality of second wires 150b is 0.5 mm or more, the plurality of first wires 150a and the plurality of second wires 150b may be recognized by the eye or recognized as shade. Thus, a FOS (Front of Screen Test) defect may occur.

A distance d4 between the plurality of first wires 150a or the plurality of second wires 150b may be appropriately determined in a range in which the plurality of wires 150 can endure the weight of the diffusion member 160 and the optical sheet 170. Further, the distance d4 may be freely determined depending on the overall size of the backlight unit or the number and a distance of light sources to be disposed. The distance d4 is not limited thereto. The distance d4 between the plurality of first wires 150a and the plurality of second wires 150b may be 50 mm or more. This is because if the distance d4 between the plurality of first wires 150a and the plurality of second wires 150b is too small, the overall brightness of the liquid crystal display device 100 may be reduced.

As described above, the liquid crystal display device 100 according to an exemplary embodiment of the present disclosure uses the thin diffusion member 160 formed of a fiber material instead of the related art diffusion plate. Thus, a thickness of the liquid crystal display device 100 is significantly reduced. Specifically, the related art diffusion plate has a thickness of about 1.5 mm, whereas the diffusion member 160 formed of a fiber material has a thickness of about 0.1 mm. Even if the plurality of wires 150 is disposed under the diffusion member 160 so as to support the diffusion member 160, since the plurality of wires 150 has a thickness of 0.3 mm or less, the sum d2 of the thicknesses of the diffusion member 160 and the plurality of wires 150 is still smaller than the thickness of the related art diffusion plate. Therefore, the overall thickness of the liquid crystal display device 100 can be greatly reduced. Further, in the liquid crystal display device 100 according to an exemplary embodiment of the present disclosure, the plurality of wires 150 is provided under the diffusion member 160. Thus, it is possible to support the diffusion member 160 and the plurality of optical sheets 170 located on the plurality of wires 150. Specifically, in case of using the diffusion member 160 having a small thickness, the plurality of wires 150 can minimize sagging or damage of the diffusion member 160 caused by the weight of the optical sheet 170 disposed on the diffusion member 160.

The exemplary embodiments of the present disclosure can also be described as follows:

According to an embodiment of the present disclosure, a liquid crystal display device may comprise: a guide frame, a plurality of light sources on the guide frame, a diffusion member above the plurality of light sources as being spaced away from the plurality of light sources and a plurality of wires between the plurality of light sources and the diffusion member.

The guide frame may include a lower frame, a lateral frame, and a support, and the plurality of wires and the diffusion member are disposed on the support.

The liquid crystal display device may further comprise a double-sided adhesive member placed on the support and bonded to the plurality of wires and the diffusion member.

The support may be a protrusion protruded inward from the lateral frame.

The plurality of wires may have a thickness of 0.5 mm or less.

The plurality of wires may include a plurality of first wires and a plurality of second wires disposed to intersect with each other.

The plurality of first wires may have first portions on the plurality of second wires and second portions under the plurality of second wires in an area where the plurality of first wires intersect with the plurality of second wires, and the first portions and the second portions are located alternately.

The plurality of wires may be formed of fluoro carbon.

The diffusion member may have a thickness of 0.3 mm or less and is formed of a fiber material.

The diffusion member may include one or more members selected from the group consisting of polyester, polyurethane, poly methyl methacrylate (PMMA), and nylon.

According to another embodiment of the present disclosure, a liquid crystal display device may comprise a guide frame, a plurality of light sources on the guide frame, a diffusion member above and spaced away from the plurality of light sources, configured to diffuse light emitted from the plurality of light sources, and formed of a fiber material, a plurality of optical sheets on the diffusion member and a plurality of wires in contact with the diffusion member so as to support the diffusion member and the plurality of optical sheets and fixed to the guide frame.

The plurality of wires may include a plurality of first wires and a plurality of second wires, and the plurality of first wires and the plurality of second wires intersect with each other so as to form a mesh pattern.

According to other embodiment of the present disclosure, A liquid crystal display device comprising: a plurality of light sources in a frame; a functional film above the light sources to provide light diffusion and configured to have a significantly reduced thickness when compared to a related art diffusion plate; and a support structure under said functional film to provide support thereto.

The functional film contains birefringent microfibers configured to reduce mura phenomenon.

The thickness of said functional film is between 0.1 to 30 µm.

The birefringent microfibers are made of one or more materials among polyester, polyurethane, polymethyl methacrylate (PMMA), and nylon.

The support structure is configured as a plurality of metal lines or wires in a mesh-like pattern with a thickness of 0.5 mm or less.

The mesh-like pattern is configured to have certain dimensions in accordance with the size, shape and weight of said functional film.

The metal lines or wires are configured to have a relatively high refractive index to provide additional light diffusion.

The light sources are configured as direct-type light emitting diodes.

Although the exemplary embodiments of the present disclosure have been described in detail with reference to the accompanying drawings, the present disclosure is not limited thereto and may be embodied in many different forms without departing from the technical concept of the present disclosure. Therefore, the exemplary embodiments of the present disclosure are provided for illustrative purposes only but not intended to limit the technical concept of the present disclosure. The scope of the technical concept of the present disclosure is not limited thereto. Therefore, it should be understood that the above-described exemplary embodiments are illustrative in all aspects and do not limit the present disclosure. The protective scope of the present disclosure should be construed based on the following claims, and all the technical concepts in the equivalent scope thereof should be construed as falling within the scope of the present disclosure.

What is claimed is:

1. A liquid crystal display device comprising:
a guide frame;
a plurality of light sources on the guide frame;
a diffusion member above and spaced away from the plurality of light sources, configured to diffuse light emitted from the plurality of light sources, and formed of a fiber material;
a plurality of optical sheets on the diffusion member; and
a plurality of wires in contact with the diffusion member so as to support the diffusion member and the plurality of optical sheets and fixed to the guide frame,
wherein the plurality of wires includes a plurality of first wires and a plurality of second wires disposed to intersect with each other so as to form a mesh pattern,
wherein the plurality of first wires has first portions on the plurality of second wires and second portions under the plurality of second wires in an area where the plurality of first wires intersect with the plurality of second wires, and the first portions and the second portions are located alternately, and
wherein the plurality of wires is formed of fluorocarbon.

2. The liquid crystal display device according to claim 1, wherein the thickness of the diffusion member is between 0.1 to 30 µm, and
wherein the plurality of wires has a thickness of 0.5 mm or less.

3. The device of claim 2, wherein said diffusion member contains birefringent microfibers configured to reduce mura phenomenon.

4. The device of claim 3, wherein said birefringent microfibers are made of one or more materials among polyester, polyurethane, polymethyl methacrylate (PMMA), and nylon.

5. The device of claim 1, wherein said mesh-like mesh pattern is configured to have certain dimensions in accordance with the size, shape and weight of said functional film.

6. The device of claim 5, wherein said wires are configured to have a relatively high refractive index to provide additional light diffusion.

7. The device of claim 6, wherein said light sources are configured as direct-type light emitting diodes.

* * * * *